United States Patent

[11] 3,612,075

| [72] | Inventor | Vernon H. Cook<br>RD 2, Far Hills, N.J. 07931 |
|---|---|---|
| [21] | Appl. No. | 791,024 |
| [22] | Filed | Jan. 14, 1969 |
| [45] | Patented | Oct. 12, 1971 |

[54] AIRCRAFT DEICING APPARATUS
22 Claims, 7 Drawing Figs.

[52] U.S. Cl. .................................................. 134/99,
126/271.1, 134/123, 134/172
[51] Int. Cl. ................................................... B60s 3/00
[50] Field of Search .......................................... 134/45, 99,
123, 172; 126/271.1

[56] References Cited
UNITED STATES PATENTS

| 3,533,395 | 10/1970 | Yaste | 134/45 X |
| 2,475,676 | 7/1949 | Ralph | 134/172 X |
| 3,349,783 | 10/1967 | Ellis | 134/45 |
| 3,439,372 | 4/1969 | Collier | 15/50 X |
| 3,451,094 | 6/1969 | Kywi | 134/123 X |
| 3,460,177 | 8/1969 | Rhinehart et al. | 15/50 X |
| 3,461,889 | 10/1969 | Saxonmeyer | 134/45 X |

FOREIGN PATENTS

| 1,144,609 | 2/1963 | Germany | 134/123 |

*Primary Examiner*—Robert L. Bleutge
*Attorney*—Watson, Cole, Grindle & Watson

ABSTRACT: Apparatus for deicing aircraft by means of a permanent structure capable of moving longitudinally between the ends of the aircraft and vertically adjustable to accommodate different aircraft heights. A frame, comprising a pair of vertical supports, is provided wherein a control cabin and an attached inwardly directed horizontal boom are mounted for vertical elevation on each support, the boom having spray nozzles for delivering deicing fluid onto the fuselage, wing, tail and control surfaces of the aircraft as the frame is moved therealong. The boom may be automatically adjustable to conform to the horizontal profile of a given aircraft and the control cabin is located just below the boom to enable the operator to maintain eye-level assurance that the aircraft is sufficiently freed from ice and snow.

INVENTOR,
VERNON A. COOK
BY
Watson, Cole,
Grindle & Watson
ATTORNEYS

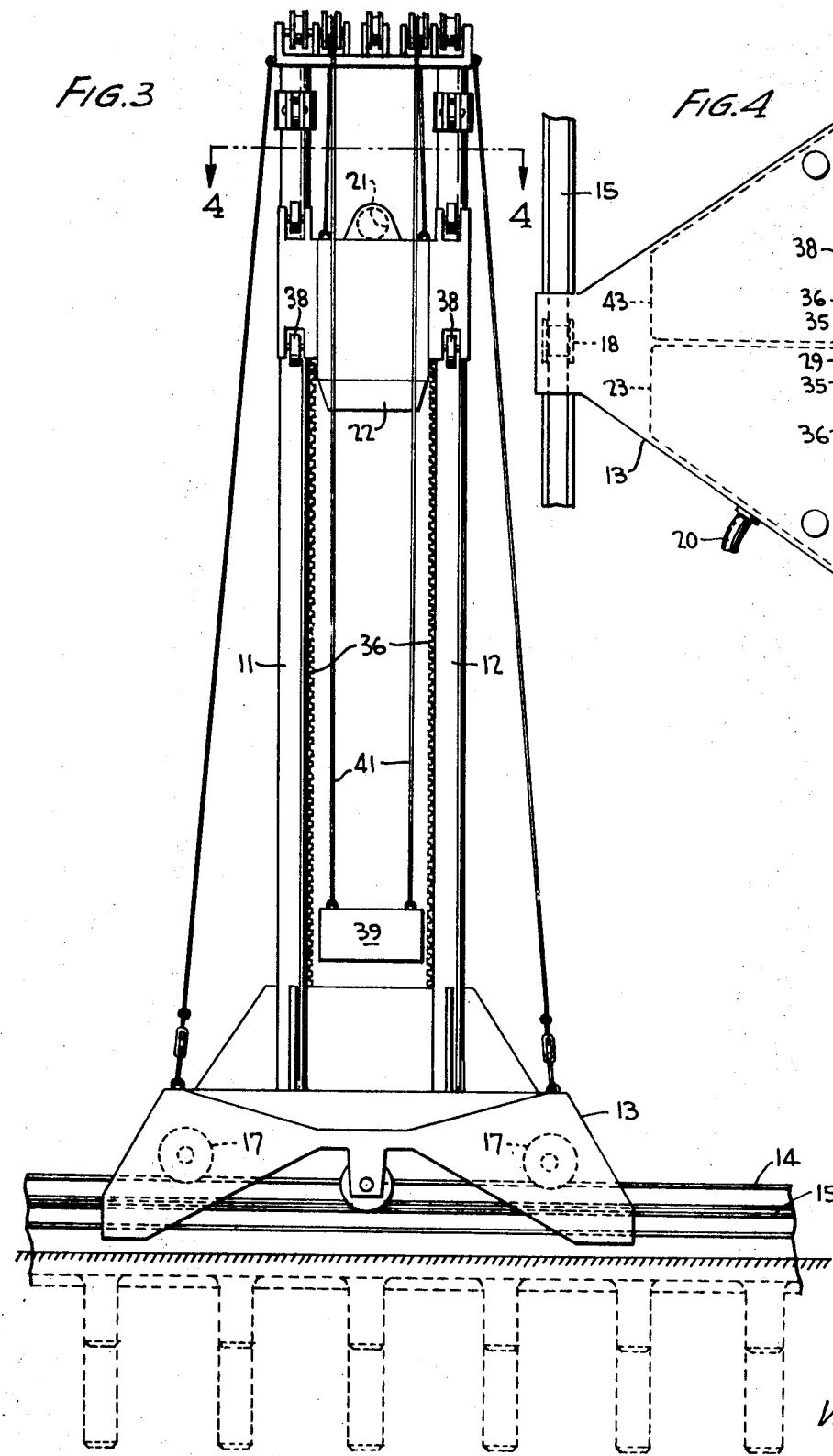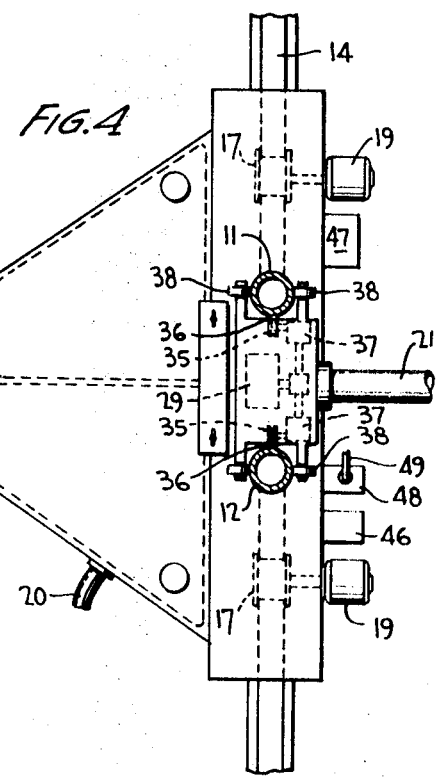
INVENTOR,
VERNON H. COOK
ATTORNEYS

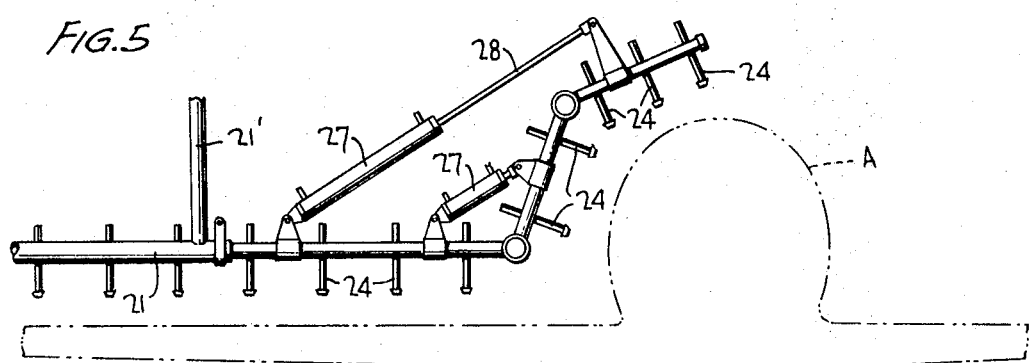
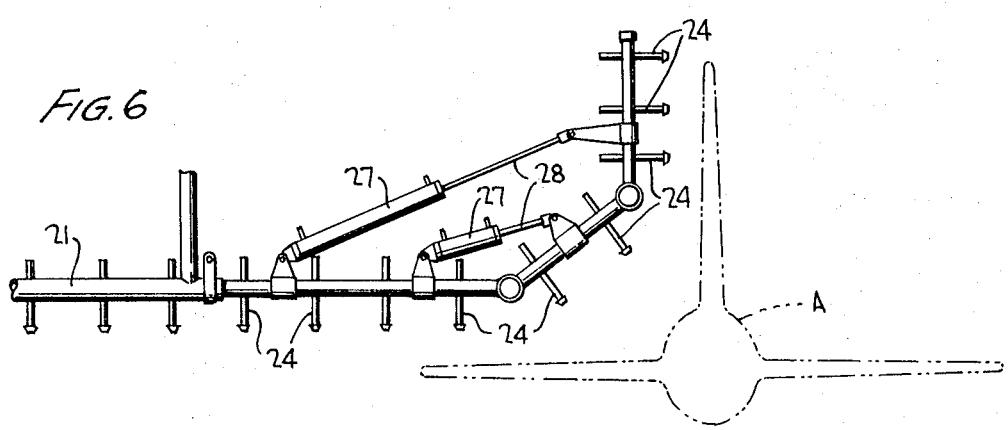
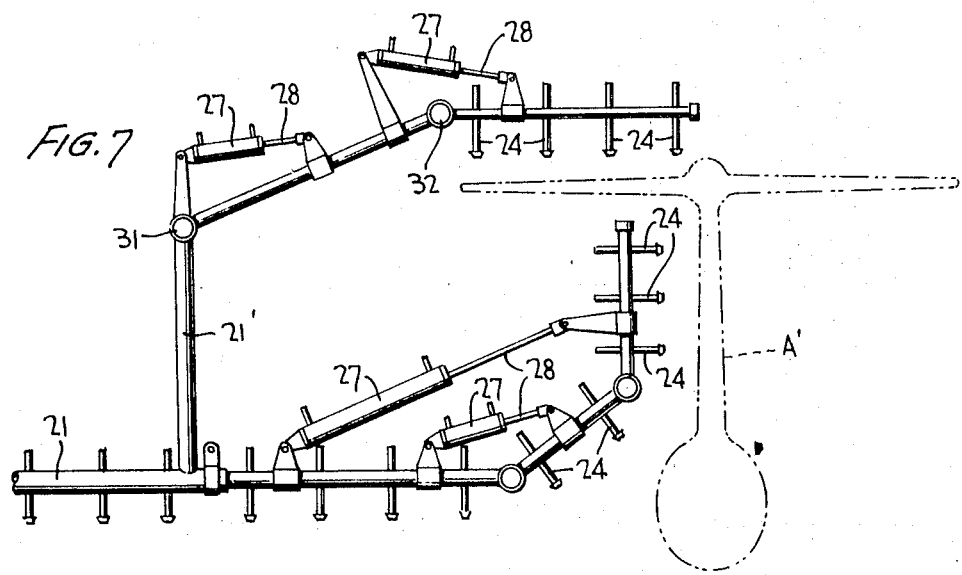

AIRCRAFT DEICING APPARATUS

This invention relates generally to a deicing apparatus and, more particularly, to a rapid and efficient means for deicing airplanes within practical limitations of airport space.

The problem of snow, ice or frost accumulation on airplanes or other types of aircraft prior to flight has been plaguing the industry for some time. Without adequate removal of this accumulation, the performance and handling characteristics of the aircraft during flight may be affected to varying degrees.

Also, with the advent of larger airplanes over the past few years, and with the expectation of still larger airplanes within the near future, removal of snow, ice and frost accumulation before airplane takeoff has become an ever-increasing burden.

Current deicing techniques employed include, almost exclusively, the use of tree spraying equipment, flame devices for melting the ice and snow, or modified cherry pickers at each airport so that a crew of several men are needed to manipulate any one of these devices thereby proving to be unduly time-consuming, crude and costly for the specific airline employing its use.

One solution to a serious operational problem, that is, one caused by sudden and unforeseeable atmospheric conditions, is to provide a self-contained and self-powered structure designed to spray anti-icing fluid on all upper and lateral surfaces of the airplane. Such a solution for the removal of ice, snow and frost accumulation from airplanes and various other types of aircraft, forms therefore the principal object of the present invention.

Another object of this invention is to provide an automatic deicing apparatus for airplanes, whereby savings in time and aircraft fuel, reduction of schedule disruptions, improved customer relations, reduced deicing costs and elimination of hazardous service equipment are all possible with the instant novel apparatus.

A further object of the instant design is to provide an aircraft deicing apparatus which is of a permanent structure and is capable of manually or automatically moving longitudinally and vertically about an aircraft so as to spray a sufficient amount of a deicing medium onto the fuselage, wing, tail and control surfaces of the aircraft.

A still further object of the invention is to provide a deicing device of the type described comprising a frame including a pair of vertical supports capable of moving along an airplane on suitably provided rails, a horizontal broom projecting inwardly from each support capable of moving vertically along the supports and being articulated to conform to the horizontal profile of any given aircraft.

A still further object of this invention is to provide a means for deicing aircraft using an apparatus in the manner above-described wherein compressed air is discharged through each boom for removing large accumulations of snow from the aircraft surfaces before a quantity of ethylene glycol or other suitable deicing fluid is discharged onto these surfaces through each boom.

A still further object of the instant invention is to provide a deicing apparatus for airplanes of the character described wherein the movable supports are each equipped with a control cabin for allowing an operator to maintain eye-level assurance that the aircraft is sufficiently freed from ice, frost and snow during the deicing operation.

A still further object is to provide aircraft deicing apparatus of the type described, wherein the deicing operation for standard airplane designs may be carried out by means of a programmed control or, if necessary, manual control for all nonstandard designs or noncommercial carriers.

Other objects, advantages and novel features of the invention will become apparent from the following detailed description of the invention when considered in conjunction with the accompanying drawings wherein:

FIG. 3 is a side view of one section of the apparatus looking along the line 3—3 of FIG. 1;

FIG. 4 is a sectional view showing details of the apparatus, taken along the line 4—4 of FIG. 3; and FIGS. 5, 6 and 7 are partial end views, respectively, showing the manner of articulating the end portion of the spray boom of one apparatus section, only, in its relation to various contours of the aircraft as the apparatus is moved longitudinally therealong.

Figure 1:
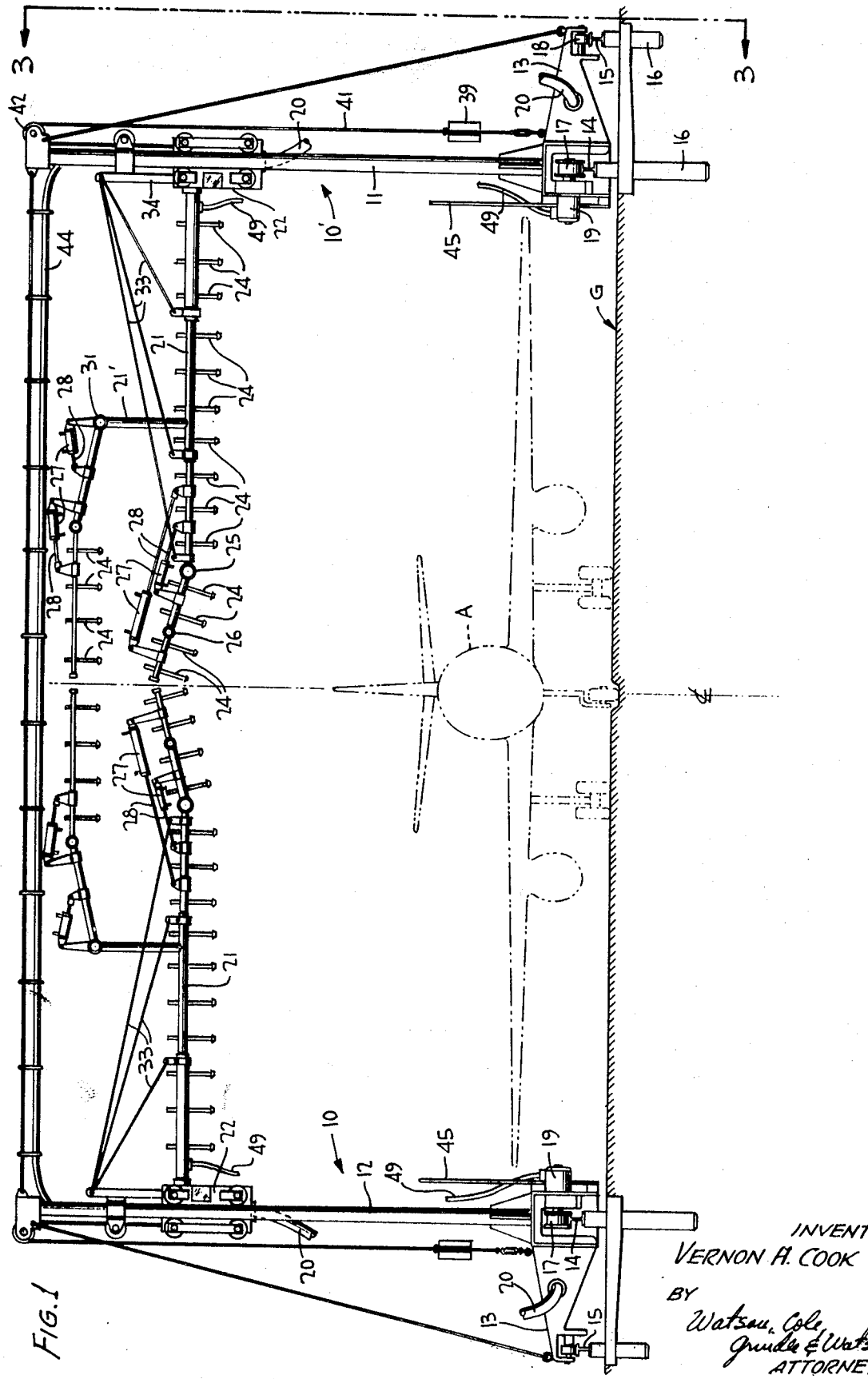
FIG. 1 is an end view of the overall deicing apparatus in its relation to an airplane shown in phantom.

Referring now to the drawings wherein like reference characters refer to like and corresponding parts throughout the several views, there is shown in FIG. 1 the deicing apparatus according to the present invention generally indicated by the reference numerals 10 and 10' which are symmetrical sections about the centerline as shown in the drawing. Since each part in section 10 has a corresponding part in section 10', only one of such parts will be described without the use of additional subscripts or primed numerals.

Each half-section of the overall apparatus comprises a pair of vertical uprights 11, 12 (see FIGS. 3 and 4) mounted at one end on a carriage 13. Each carriage, in turn, rests on an inboard rail 14 and an outboard rail 15 for longitudinal movement along an airplane A. Of course, the horizontal distance between the inboard rails 14 is determined by the longest wing span of an airplane intended to be serviced by the apparatus. The inboard and outboard rails are preferably mounted upon a suitable number of pilings 16 which are driven to a predetermined depth below the surface of the ground G depending upon varying soil and weather conditions in each location.

A pair of inboard wheels 17, mounted within the interior of part of the carriage 13, and a single outboard wheel 18, mounted near the outer end of the carriage 13, supports the carriage on the outboard and inboard rails, respectively, as shown in FIG. 1. A drive motor 19 is operatively connected to each inboard wheel 17 thereby causing movement of the carriage along the rail at any desired speed.

The means for delivering a quantity of deicing fluid to the airplane comprises an inwardly directed horizontal boom 21 located between each upright 11, 12 which spans half the distance between rails 14, as clearly shown in FIG. 1. Each boom 21 is attached at one end to the upper portion of a control cabin 22 mounted on the uprights for vertical movement therealong. A hose 20 is provided for conducting deicing fluid from a deicer tank 23, contained within the carriage 13, to the hollow boom 21. An ordinary pump, provided in the housing 46, pumps deicing fluid, which may be in the form of the commonly used ethylene glycol, from the tank 23, through hose 20 and into boom 21 for discharging onto the airplane through a plurality of nozzles 24.

Each boom 21 comprises a number of hollow pipe sections, the innermost ones of which are jointed as at 25, 26 for articulated movement by means of suitable hydraulic piston units 27, each having a rigid piston rod 28 interconnecting the respective units to the boom 21. THe rods 28 are axially movable in the conventional manner by means of a pump 29', housed within a portion of the control cabin 22, which ports hydraulic fluid to one side of the piston in each unit 27. Although no hydraulic lines are shown extending from the pump 29', a part of the exit and entrance ports on each unit 29 are evident.

Extending vertically upward from each boom 21 is an auxiliary boom section 21', shown in FIG. 1 as comprising three interconnected sections jointed as at 31, 32 which are also capable of adjustment by means of hydraulic piston units 27 and their accompanying piston rods 28. A number of nozzles 24 are also provided for downward spraying action as shown, except that a horizontal inwardly directed nozzle 24 is also shown for purposes to be hereinafter described.

Each boom 21 is, of course, stabilized by means of a plurality of guy wires or cables 33, extending between various section ends of the boom and a vertical rod 34, attached to the top portion of the control cabin 22.

The control cabin, along with its attached horizontal booms 21, is vertically movable along the uprights 11, 12 by means of a drive pinion 35 in operative engagement with a rack gear 36, mounted on each upright 11, 12 of each section 10, 10' of the apparatus, as clearly shown in FIGS. 3 and 4 of the drawings. The drive pinions 35 are driven through a gear box 37 in operative engagement with a hydraulic motor 29. The cabin 22 is vertically guided along the uprights 11, 12 by means of a pair of rollers 38 in engagement with each upright as shown more clearly in FIG. 4. In order to counterbalance the weight of the control cabin 22, somewhat, a counterweight 39 is attached by means of a pair of continuous cables 41 to the top of the control cabin, each cable extending around a suitable pulley 42 mounted on the topmost portion of the uprights, as shown in FIG. 3. The use of such a counterweight 39 permits the control cabin 22 to be more easily raised and lowered since it acts to diminish the weight of cabin 22.

It should be noted that a fuel tank 43 is provided within a portion of the carriage 13 so that a diesel engine (not shown) provided within housing 46 on each carriage, may be continuously supplied with a sufficient amount of fuel for driving each motor 19 simultaneously. Each of the motors 19 on each carriage may be of the electrical type operatively connected in synchronization to the diesel engine. Also, it should be noted that a conduit 44 is provided which spans across the top of the apparatus between each pair of uprights 11, 12 thereby providing communication between, for example, the hydraulic tanks located within each control cabin 22 and between any other electrical or power controlled means located within the section 10, 10' of the apparatus. In this way, both sections may be operated simultaneously without the need for control cables draped across the surface of the ground.

In the event removal of heavy accumulations of snow becomes necessary, an air compressor 48 is suitably mounted on the carriage 13 so that air under pressure, via air hose 49, may be conducted to the boom 21 for discharge through several of alternate ones of the nozzles 24. Although not shown, it should be understood that a compressed airline will be needed to communicate with each such nozzle 24 along the booms 21, 21'. In the alternative, each nozzle could be designed in a conventional manner for discharge of both deicing fluid and compressed air from independent conduits.

The operation of the deicing apparatus according to the present invention may be described as follows:

The structure sections 10, 10' are to be strategically disposed at an airport as permanent installations on presently used ramps leading to the outer runways. Airplanes, such as A shown in FIGS. 1 and 2, would taxi to an indicated position between the carriages 13, as in FIG. 2, and thereafter stop when its tail section lies directly astride from carriage 13, shown in phantom. Of course these carriages could have been located in the vicinity of the nose end of the aircraft on their respective rails 14, 15 at the time airplane A was brought to a stop. In any event, after the plane taxis to its proper position, the engines are shut off, although facilities may be easily provided for powered connections to the airplane during the deicing interval. An operator, situated in one or the other of the control cabins 22, would then adjust the controls for raising and elevating the cabin and for moving the articulated boom sections in accordance with the height and profile of the tail section of the aircraft, so that the deicing fluid may be directly sprayed onto this section of the airplane. Since individual remote pressure adjustment controls are provided for each pair of nozzles, i.e., complementary ones on each of the sections 10, 10', the operator will include in his adjustment, the opening of only those nozzles 24 which are positioned directly above the tail section so as to conserve as much deicing fluid as possible. Reference should also be made to FIG. 6 of the drawings, wherein it can be seen that the vertical rudder section of the aircraft may be readily sprayed with the deicing fluid simply by manipulating the sections of the boom to a position shown in this figure.

Figure 2:
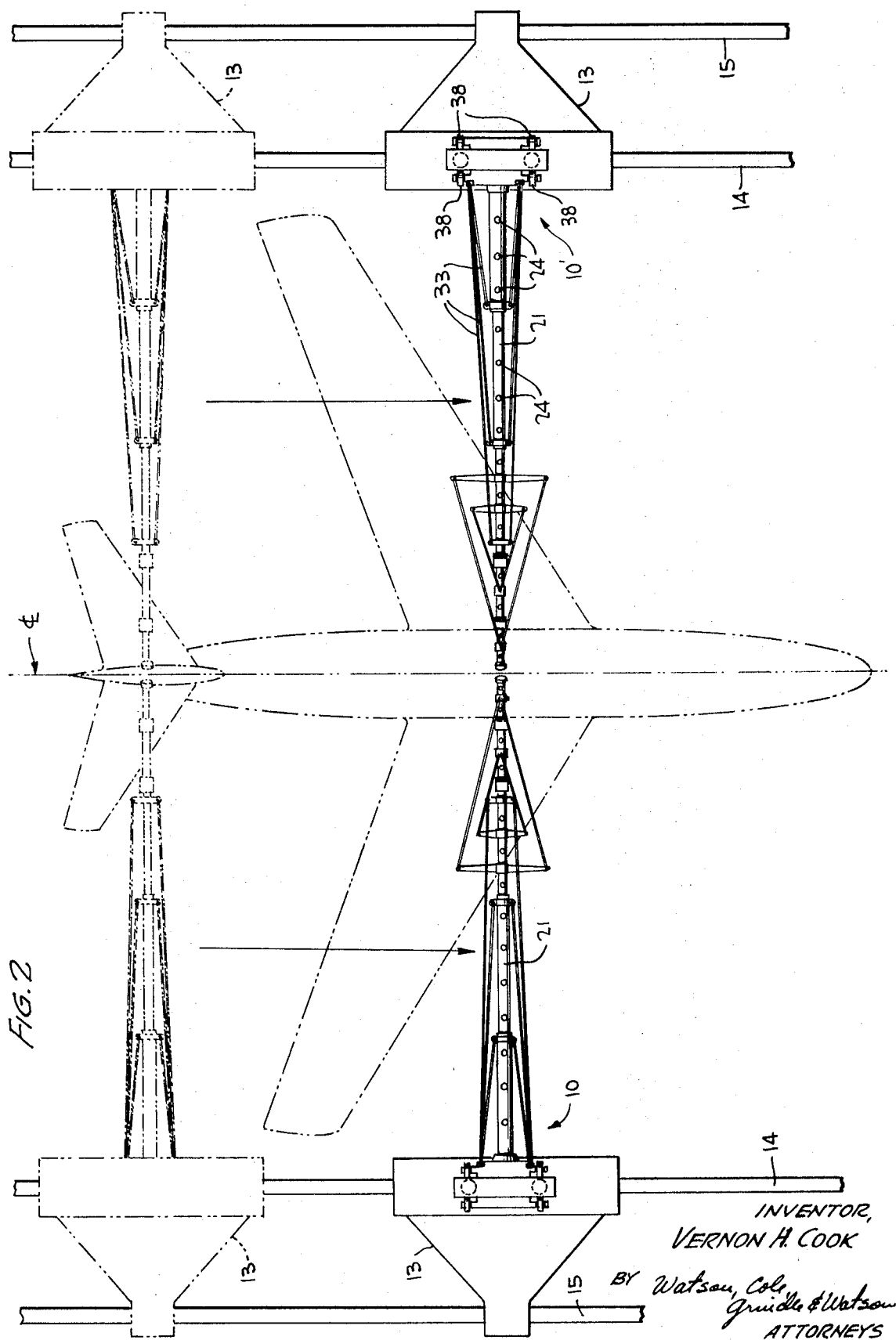
FIG. 2 is a top view of the apparatus shown in FIG. 1, with a phantom showing of the apparatus after being moved longitudinally along the aircraft.

The carriage structure of each section will then proceed simultaneously at a predetermined speed to pass over the plane fuselage and wing sections, spraying the deicing fluid thereon from the position shown in FIGS. 5 and 2 of the drawings. As the carriage section proceeds toward the nose end of the aircraft, the operator allows only those nozzles 24 to be opened which are located directly above the wing section to be deiced. Accordingly, only those nozzles lying directly above the trailing edge of the wing will be first opened by the operator and continue to be opened until they pass beyond the leading edge of each wing end. In this way, the nozzles 24 along each boom section 21 are being constantly opened and closed as they pass over a swept-back wing span of the type shown in FIG. 2. Of course, those nozzles, as shown in FIG. 5 directed toward the fuselage of the aircraft, will remain open throughout the entire deicing operation.

In FIG. 7, it can be seen that even a tail section having such an elevated rudder can be conveniently sprayed with the deicing fluid simply by the manipulation of the auxiliary boom 21' and its attached articulated sections, in the same manner as described above with regard to the boom 21. It should be noted that heavy accumulations of snow may be first removed from the upper surfaces of the aircraft by means of an air blast emanating from several or alternate ones of the nozzles 24 via air hose 49. Manual control means (not shown) are provided for use on all nonstandard designs or noncommerical carriers by the operator in each control cabin 22. However, for the standard aircraft which frequent the airports daily, the apparatus is capable of being placed under programmed control according to some conventional technique which forms no part of this invention.

Depending on the wind velocity, its direction and other weather conditions, the entire airplane can be treated with anti-icing fluid in an extremely short interval of time, as compared to those deicing techniques which are currently in use. After the operation is completed, the airplane will then start its engines and taxi off for the takeoff runway. The next plane will then move up to the same position as the first and the operation would be repeated in a reverse direction toward the tail section of the aircraft, so as to return to its original position.

It should be noted that each of the cabins 22 is designed as a heated enclosed cabin for the comfort and protection of the operator situated therein. Also, each cabin is designed to permit the operator to view the nozzles 24 at eye-level, in order to make sure that the aircraft is sufficiently freed from ice, frost and snow during the removal operation.

It should be recognized that, by means of radio communications, the operator directs the proper positioning of the airplane and is advised by the pilot when his engines are cut off. For standard airplanes, such as those being currently used by most of the commercial airline companies, the operator energizes the controls by inserting a proper card in a suitable control panel designed for the purpose. This will act to program subsequent operation of the apparatus in the conventional manner. For example, the drive motors 19 will be automatically started along with the hydraulic motor 9 and pump 9'. Of course, there are the necessary pumps contained in housing 46 for the fuel in tank 43 and the deicing fluid in tank 23 which are operatively connected in a conventional manner. Also, it should be understood that a battery box 47 and a control alternator or generator (also powered from the diesel engine) are provided for each section 10, 10' of the apparatus along with any other commonly used control components and control lines necessary for complete operation of the overall deicing equipment. Many of these components and control conduits are being omitted from the drawings in the interest of clarity.

In continuing with the description of the operational equipment, the operator will depress a "start" button suitably located on his control panel within the cabin 22 in order to commence operation and continue in automatic sequence to a stop after an airplane has been completely deiced. During the course of operation an emergency stop button may also be provided for the operator. In any event, the apparatus would commence operation either from its position as shown in phantom in FIG. 2 of the drawings, or from its position directly above the nose portion of the aircraft A as previously described. Since there is communication available between the controls of the apparatus sections 10, 10' through the overhead conduit 44, the programmed control of the apparatus will commence longitudinal, vertical and nozzle adjustment of both sections 10, 10' simultaneously. After initial commencement of operation of the apparatus in the direction of the arrows as shown in FIG. 2, the nozzles of booms 21 on both sections as indicated in FIG. 6 (although only one section 10 of the apparatus is shown), discharge an adequate amount of ethylene glycol or any other suitable deicing medium to the rudder and stabilizer of the tail section only. Such fluid is not discharged through any of the remaining nozzles 24 of the booms 21 at this time, since they are shut off by means of the programmed automatic control mechanisms. As the apparatus proceeds toward the nose section of the aircraft, the jointed end sections of the booms 21 automatically, or manually, as the case may be, adjust to the position as shown in FIG. 5. Now, as each nozzle 24 on the sections 10, 10' passes over the trailing edge of the wing section, they are automatically opened for the discharging of fluid onto the wing and remain open until they reach the leading edge of the wing. For the swept-back type of wing span shown in FIG. 2, the trailing point of each wing chord progresses along a straight line toward the nose section from the tip-end chord to the root-end chord. Accordingly, the nozzles 24 will be made to open as they pass over the wings between the trailing point and the leading point for each wing chord. In this way, discharge of the costly deicing fluid is not wasted, since only the intended surfaces to be sprayed are coated with the fluid. Because several of the nozzles 24 are connected to airline 49, compressed air may be delivered to the wing, tail, fuselage and control surfaces of the aircraft before the deicing fluid is discharged through the same or alternate ones of the nozzles 24. In this way, any significant accumulation of snow on these surfaces will be adequately removed by the air nozzles before the underlying frozen surface is sprayed with the deicing fluid. It should be seen, therefore, that the operating time and efficiency of the instant apparatus will be considerably improved with the use of such air nozzles.

If necessary, the carriage 13, tracks 14, 15 and all the remaining contacting surfaces of the apparatus may be provided with spray nozzles for delivering a quantity of deicing fluid in advance of any movement between these surfaces. For example, in order to maintain the top surfaces of the rails 14, 15 free from ice, frost or snow accumulation during the course of the equipment operation, air or fluid nozzles or a nozzle for delivering both air and fluid, could be easily provided on both sides of each carriage 13 directed downwardly toward the top surfaces of the rails 14, 15. In addition, it may become desirable to provide a rack gear on one or both of the rails 14, 15 and a suitably located pinion gear in combination therewith located on the carriage 13. In this way, each of the apparatus sections 10, 10', which may be of substantial weight, may be moved along the aircraft without any slippage between the wheels 17, 18 and their respective rails 14, 15.

Under extreme weather conditions of high winds and heavy snow, for example, adjustment of the speed of the structure could be made by the operator without overriding the programmed cycle. Means for providing such an adjustment would, or course, be installed in each section of the apparatus in the usual manner. Also, it may be desirable for the position, velocity and flow of each nozzle pair to be under the control of each operator while the apparatus is moving along the aircraft under the automatic programmed control.

In regard to nozzles 24, it should be recognized that each nozzle may be of conventional design for discharging either air or deicing fluid or, for discharging air and fluid separately from a single nozzle.

In order to assist the operator in his job of assuring that all the intended surfaces of the aircraft are properly removed of ice, frost and snow, wind guards and wipers may be provided on each of the cabins 22 for storms approaching at an oblique angle. In addition, spot signals and lights required by current regulations may be provided for each apparatus.

Furthermore, it is to be understood that the piston units 27 may be substituted by small electric or hydraulic motors hooked into the electric or hydraulic systems of the apparatus for manipulating the jointed ends of the booms 21. Also, the nozzles 24 may be axially adjustable and vertically adjustable along the longitudinal axis of the aircraft, if necessary. As an alternative to any of the nozzles 24 serving as air delivering means, a plurality of apertures along the lower side of the booms 21 may be provided. It must be also noted that the control cabins 22 may be lowered to within ten feet of the ground G for servicing and maintenance and for permitting the operator to enter and leave the cabin by means of a ladder 45.

Obviously, many modifications and variations of the present invention are possible in the light of the above teachings. It is therefore to be understood that within the scope of the appended claims, the invention may be practiced otherwise than as specifically described.

What is claimed is:

1. Apparatus for removing an accumulation of ice, frost and snow from an aircraft before takeoff, comprising:
   a support frame having a width in excess of the aircraft wing span;
   means for moving said frame longitudinally along the aircraft;
   spray means on said frame for delivering deicing fluid onto the aircraft;
   control cabin means on said frame for permitting eye-level assurance that the aircraft is being sufficiently deiced by said spray means;
   means for elevating and lowering said spray means and said control cabin means together; and
   means for adjusting said spray means to conform to the horizontal profile of a given aircraft.

2. The apparatus according to claim 1 wherein said spray means serves also to deliver air onto the aircraft so as to remove any substantial accumulation of snow therefrom before said spray means delivers deicing fluid onto the aircraft.

3. The apparatus according to claim 2 wherein said support frame includes carriage means along both sides of the aircraft spaced a distance apart in excess of the aircraft wing span, and vertical uprights mounted at one end thereof to each of said carriage means.

4. The apparatus according to claim 3 wherein said moving means includes an inboard rail located beneath each of said carriage means, inboard wheels movably mounted on each of said carriage means for resting on said inboard rails, and drive means operatively connected to said inboard wheels for moving said support frame longitudinally along the aircraft.

5. The apparatus according to claim 4 wherein said moving means further includes an outboard rail lying parallel to each of said inboard rails at a distance outboard of said frame, said carriage means spanning between each pair of said inboard and outboard rails, and an outboard wheel movably mounted on each of said carriage means for resting on said outboard rails.

6. The apparatus according to claim 5 wherein a pair of said uprights are mounted onto each said carriage means, each said pair being aligned parallel to the longitudinal axis of the aircraft.

7. The apparatus according to claim 6 wherein said frame further includes a horizontal boom mounted between each of said pair of uprights, each said boom extending inwardly one-half the distance between each said carriage means so as to span the entire width of said frame.

8. The apparatus according to claim 7 wherein said spray means includes a plurality of downwardly directed spray nozzles along the length of each said boom.

9. The apparatus according to claim 8 wherein said spray means further includes a storage tank within each said carriage means containing a quantity of deicing fluid, and means for conducting said deicing fluid from said tanks to a number of said nozzles for spraying onto the aircraft.

10. The apparatus according to claim 9 wherein a portion of each said boom is jointed for movement about an axis parallel to said rails, said spray adjusting means serving to adjust each said jointed boom portions according to the profile of the various aircraft to be sprayed.

11. The apparatus according to claim 10 wherein said control cabin means includes a control cabin mounted for vertical movement between each said pair of uprights, one of said booms being attached to each said cabin at the top portion thereof, each said cabin being large enough to accommodate an operator therein and having window means for enabling the operator to view said nozzles during the deicing operation.

12. The apparatus according to claim 11 wherein said elevating and lowering means include pinion means on each of said control cabins in operative engagement with rack means provided along said uprights, and means for driving said pinion means whereby each of said control cabins and their attached booms may be moved along the length of said uprights to accommodate different heights of the various aircraft to be sprayed.

13. The apparatus according to claim 12 wherein rollers are provided on each of said control cabins in rolling engagement with said uprights thereby maintaining proper alignment of each said cabin throughout its movement along said uprights.

14. The apparatus according to claim 13 wherein said spray means still further includes an air compressor on each said carriage means for delivering compressed air through a further number of said nozzles.

15. The apparatus according to claim 9 wherein said frame still further includes an articulated boom extending upwardly from each said boom and toward each other, said spray nozzles also being provided along the length of each said articulated boom in a downward direction and toward each other from the free end, only, of each said articulated booms, said spray adjusting means also serving to adjust said articulated boom so that various levels and heights along the aircraft may be sprayed simultaneously.

16. The apparatus according to claim 14 wherein said spray means still further includes an air compressor on each said carriage means for delivering compressed air through a further number of said nozzles.

17. Apparatus for removing an accumulation of ice, frost and snow from an aircraft, comprising
a support frame having a width in excess of the aircraft wing span;
means for moving said frame longitudinally along the aircraft;
spray means on said frame for delivering deicing fluid onto the aircraft;
said frame including generally horizontally disposed boom units extending transversely with respect to the longitudinal axis of the aircraft, and generally vertically disposed boom units, said horizontal boom units each extending toward said aircraft longitudinal axis from opposite ends of said support frames, and the free end of each said boom unit having spaced from one another sufficiently to clear a portion of the aircraft therebetween as said frame is moved longitudinally thereof;
moving means associated with each of said horizontal boom units for moving each of said horizontal boom units independently in a vertical direction toward and away from the aircraft to accommodate different elevations of the aircraft horizontal surfaces; and
said spray means being located along the length of each said boom unit whereby deicing fluid may be delivered directly onto each of the aircraft horizontal and vertical surfaces.

18. The apparatus according to claim 17, in which each of said boom units comprises a plurality of boom sections connected for relative articulated movement in a generally vertical plane.

19. The apparatus according to claim 17 wherein each of said horizontal boom units is slightly inclined upwardly at each of their said free ends.

20. In an aircraft deicing apparatus, the combination comprising
a self-propelled portable frame,
means guiding said frame for movement in a pre-selected horizontal direction,
rigid generally horizontal boom units each extending toward the longitudinal centerline of the aircraft from opposite ends of said frame and each being guided thereby for vertical movement to accommodate different vertical elevations of the aircraft horizontal surfaces,
power means associated with each of said boom units for effecting vertical movement of each simultaneously with the horizontal movement of said frame, each of said power means permitting each boom unit to be vertically moved independently of one another, said boom units being spaced from one another at their free ends sufficiently to clear a portion of the aircraft therebetween as said frame is moved in said horizontal direction, and a plurality of spray discharge nozzles located along the length of said boom units.

21. The apparatus according to claim 18, further including power means for producing relative articulated movement of said boom sections.

22. The apparatus according to claim 20 wherein each of said horizontal boom units is slightly inclined upwardly at each of their said free ends.